Patented May 8, 1934

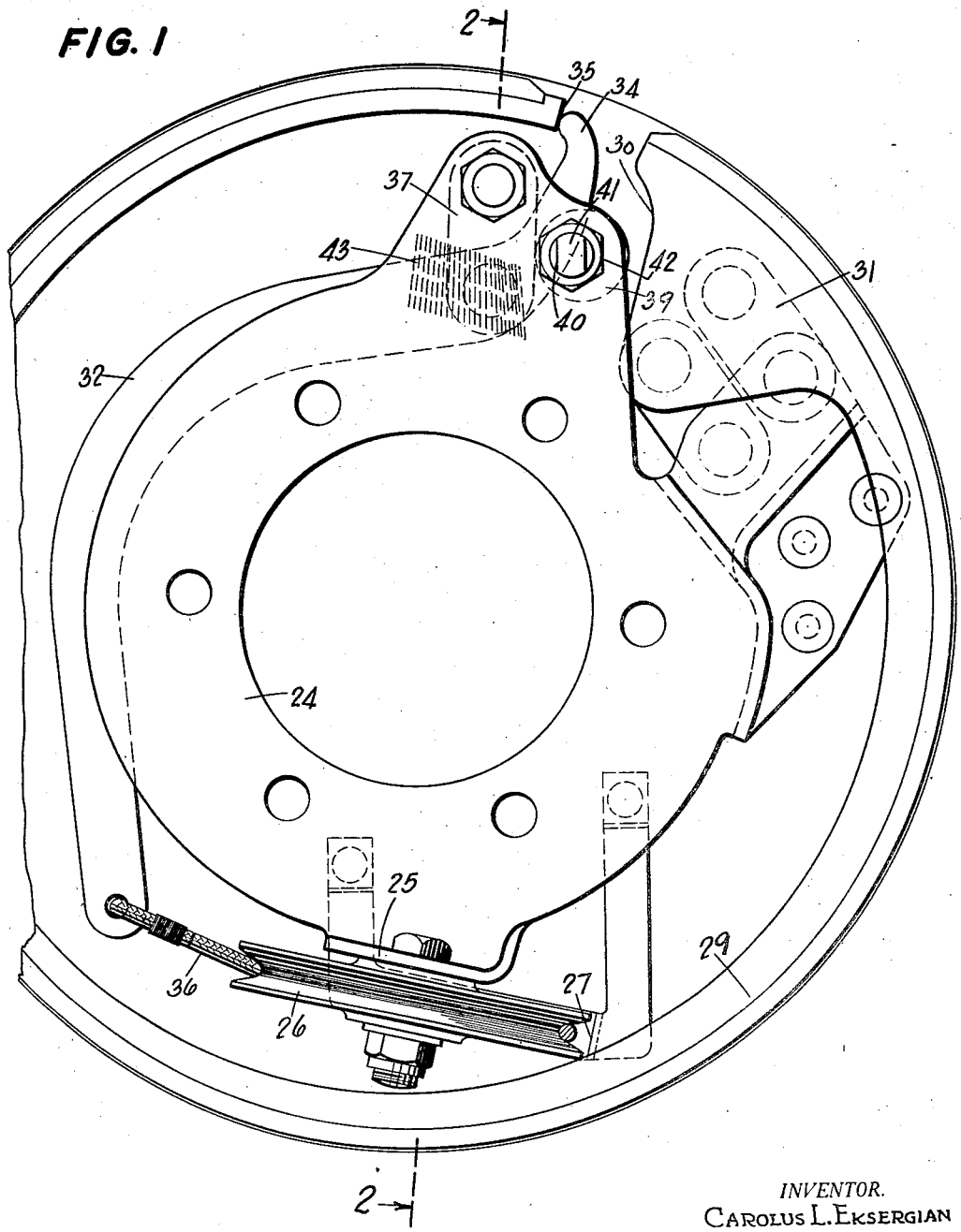

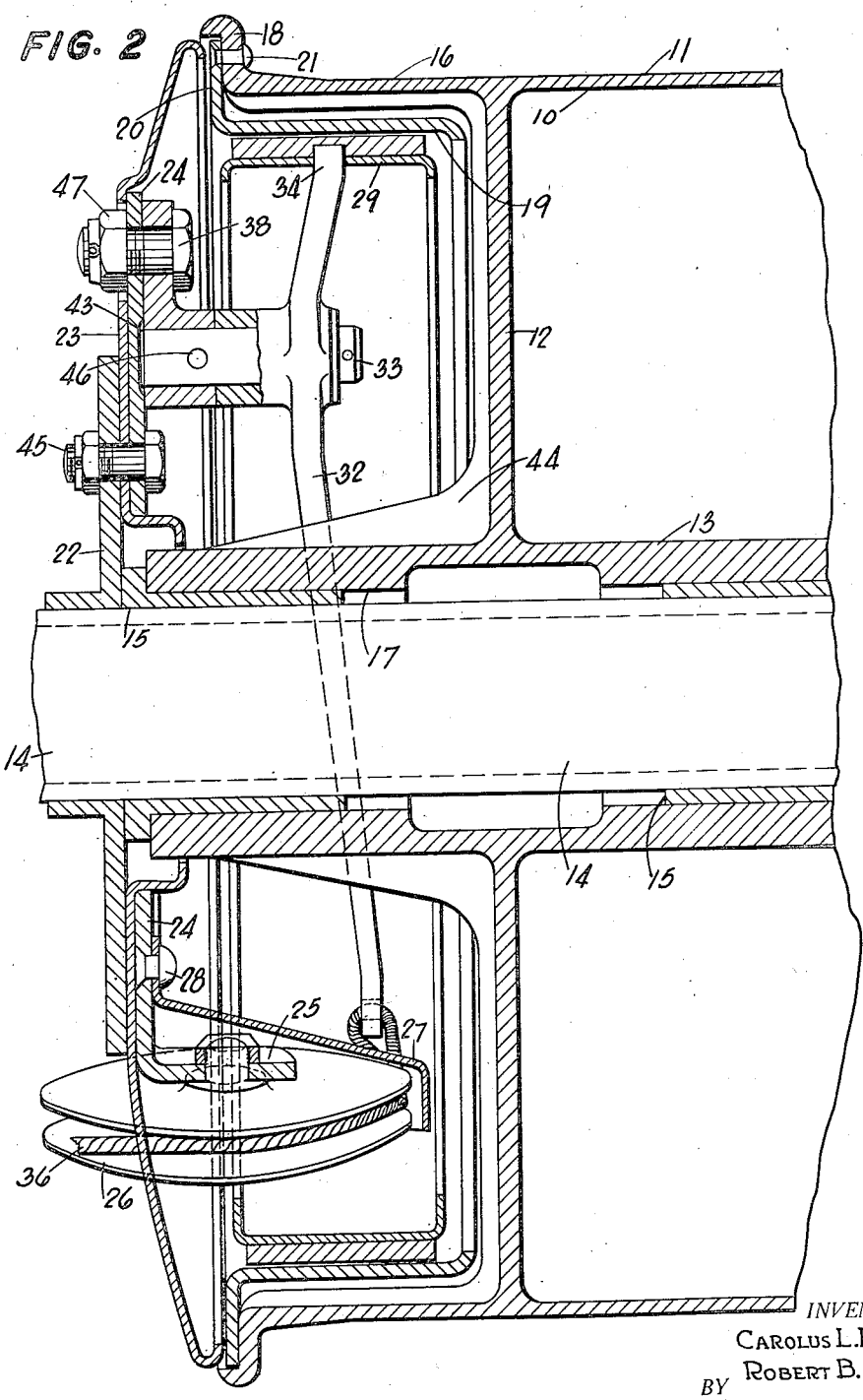

1,957,948

UNITED STATES PATENT OFFICE

1,957,948

VEHICLE WHEEL AND BRAKE

Carolus L. Eksergian and Robert B. Temple, Detroit, Mich., assignors to Budd Wheel Company, Philadelphia, Pa., a corporation of Pennsylvania Application July 31, 1930, Serial No. 472,047

8 Claims. (Cl. 188—78)

Our invention relates to the art of vehicle brakes and is especially designed for use in connection with a wheel in which there is no wheel body as such, the tire being carried directly upon the hub. Wheels of this type have recently come into use upon airplanes.

A prime object of our invention has been to provide a simple and effective operating means for a brake of this type and a compact arrangement of parts whereby the braking mechanism is almost entirely concealed within the body of the wheel.

A further object of our invention has been to provide an improved adjusting means for a brake of this kind.

We have attained these objects by connecting a tire carrying portion with a bearing portion in the center of the wheel by means of a central connecting portion which is located at a point axially removed from an end of my wheel and arranging the braking mechanism beneath the flange formed by the tire carrying portion beyond this annular connecting portion. Our brake is thus substantially entirely enclosed within the body of the wheel.

Other objects and advantages of our invention will be obvious from a reading of the sub-joined specification in the light of the attached drawings, in which:

Figure 1 is an end view of our improved brake, and

Figure 2 is a cross section on the line 2—2 of Fig. 1 illustrating the attachment of our improved brake to a wheel.

Referring to the drawings by reference characters, the numeral 10 indicates our improved wheel which comprises a tire carrying portion 11, an inner bearing portion 13, and a body portion 12 connecting the portions 11 and 13. This body portion is preferably ribbed as indicated at 44, in order to strengthen it. The stationary axle of the vehicle is indicated at 14 and is provided with suitable bearings 15 about which the portion 13 of the wheel rotates.

The connecting portion 12 is formed at a point well within the axial extremities of the wheel, and the portions 16 and 17 extending beyond the portion 12 thus constitute annular flanges. The portion 16 is provided at 18 with ears to which the brake drum is adapted to be secured. The brake drum is indicated at 19 and is provided with a flange 20 adjacent its outer end adapted to be secured by means of rivets 21 to the aforementioned ears 18.

An annular plate 22 may be formed integrally with the axle or may be non-rotatably secured thereto and this plate serves to anchor the braking mechanism. A fairing 23 is secured to the inner side of the plate 22 by means of bolts 45 which also secure the annular anchor plate 24 in position with respect to these parts. This anchor plate 24 is provided with a lug 25 adapted to constitute a bearing for the actuating pulley 26 of the brake. A guard plate 27 is riveted to the anchor plate as indicated at 28 and tends to retain a pull cord 36 upon the pulley.

The brake band is indicated at 29 and is preferably a channelled band of continuously tapering cross section as illustrated in the drawings. This band is provided on its anchor end with a pair of projections 30 adapted to receive the pivot pins of a pair of links 31 which connect this end of the band to a flange on the annular plate 24.

An operating lever 32 in the form of a bell crank is fulcrumed upon a pin 33 which is adjustably mounted in a manner to be explained hereinafter. An upper arm 34 of this bell crank lever abuts the free end 35 of the brake band and the lower arm of the bell crank lever is operated by means of a pull cord 36 which is guided by the pulley 26 to a suitable brake applying member.

A fulcrum pin 33 is floatingly carried by a lever 37 which serves to adjust the brake. This lever 37 is secured by means of a bolt 38 to the anchor plate 24, and the lever lies substantially in the same general vertical plane as the operating lever 32 and the cable pulley assembly 25—36. The pivot pin 33 is non-rotatably secured to the lever 37 as indicated at 46. An eccentric cam 39 is secured to a threaded bolt 40 which may be threaded to the anchor plate and this bolt is provided with a head 41 which is adapted to receive a suitable tool for the rotation of the eccentric. A locking nut 42 secures the bolt in adjusting position. The anchor plate is provided with a plurality of serrations 43 which are adapted to co-act with similar serrations in the end of the bolt 33 in securing the lever 37 in adjusted position.

The operation of the brake will be obvious from the above description. A simple pull upon the cord 36 effects a rotation of the bell crank 32 about its fulcrum 33 and a consequent movement of the end 34 of the bell crank to force the end 35 of the brake band into braking engagement with the drum 19.

When it is desired to adjust the brake, the nut 47 on the end of the bolt 38 is first loosened, in order to free the end of the pin 33 from the serrations 43 in the anchor plate 24. The locking screw 42 is then loosened and the bolt 41 with the eccentric 39 rotated by a suitable tool to effect the desired adjustment. Turning of the cam 39 forces the lever 37 to turn in clockwise direction about the bolt 38, thus turning the fulcrum 33 of the brake and thereby effecting a gradual adjustment thereof. When the desired adjustment has been obtained, the nuts 37 and 42 may be tightened to secure the parts in their adjusted position with the serrations in the pivot pin 33, coacting with the complemental serrations 43 in the anchor plate 24.

It will be obvious to those skilled in the art that we have provided a simple, compact, and inexpensive brake having an unusually small number of moving parts, and a brake which is provided with simple and effective adjusting means. It will also be obvious that our brake is substantially entirely enclosed within the body of the wheel and thus presents a pleasing appearance and offers no substantial wind resistance to the motion of the vehicle.

Modifications will be obvious to those skilled in the art, and we do not, therefore, wish to be limited except by the generic spirit of our invention as interpreted in the light of our subjoined claims.

What we claim is:

1. In a brake, the combination of a brake drum, a brake shoe having an anchored portion and a portion adapted to be actuated, a bell crank lever operatively connected with the end of the brake shoe adapted to be actuated and a fixed lever operatively connected with the bell crank lever and means for adjusting said fixed lever to adjust the brake.

2. In a brake, the combination of a brake drum, a brake shoe having an anchored portion and a portion adapted to be actuated, a bell crank lever operatively connected with the end of the brake shoe adapted to be actuated, a fixed lever operatively connected with the bell crank, means supported by said fixed lever about which the bell crank is fulcrumed, and means for adjusting the fixed lever to adjust the brake.

3. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, and means for adjusting said fixed lever to adjust the brake.

4. In a brake, the combination of a brake drum, a brake shoe having an anchored portion and a portion adapted to be actuated, a lever operatively connected with the end of the brake shoe adapted to be actuated, a fixed lever operatively connected with the first lever, and means for adjusting said fixed lever to adjust the brake.

5. In a brake, the combination of a brake drum, a brake shoe having an anchored portion and a portion adapted to be actuated, a lever operatively connected with the end of the brake shoe adapted to be actuated, a fixed lever operatively connected with the first lever, and means for adjusting said second lever to adjust the brake, a fixed support for said fixed lever and means for adjusting said second lever relatively to its fixed support to adjust the brake.

6. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, and means acting in a plane substantially common to the plane of said levers for exerting operating force upon said brake.

7. In a brake, the combination of a brake drum, a brake shoe having an anchored portion and a portion adapted to be actuated, a lever operatively connected with the end of the brake shoe adapted to be actuated, a second lever operatively connected with the first lever, and eccentric means for adjusting said second lever to adjust the brake.

8. In a brake, the combination of a brake drum, a brake shoe having an anchored portion and a portion adapted to be actuated, a lever adapted to be connected with the portion adapted to be actuated, a fixed lever operatively connected with the first lever, means supported by said fixed lever upon which the first lever is adapted to be pivoted, said levers lying substantially in the same plane, said fixed lever being adjustably mounted, whereby the adjustment of said fixed lever serves to adjust the brake.

CAROLUS L. EKSERGIAN.
ROBERT B. TEMPLE.